US011534940B2

(12) United States Patent
Sakurai et al.

(10) Patent No.: US 11,534,940 B2
(45) Date of Patent: Dec. 27, 2022

(54) APPARATUS FOR PRODUCING PELLET AND METHOD FOR PRODUCING PELLET

(71) Applicant: DIC Corporation, Tokyo (JP)

(72) Inventors: Yoshinobu Sakurai, Tokyo (JP); Yasuaki Kumagai, Tokyo (JP); Hisanori Ikeda, Tokyo (JP); Koji Nakanishi, Ichihara (JP); Yasuhiro Iriguchi, Tokyo (JP); Kazunari Fukasawa, Ichihara (JP); Hiroshi Yamaguchi, Tokyo (JP)

(73) Assignee: DIC Corporation, Tokyo (JP)

( * ) Notice: Subject to any disclaimer, the term of this patent is extended or adjusted under 35 U.S.C. 154(b) by 337 days.

(21) Appl. No.: 16/313,525

(22) PCT Filed: Jul. 4, 2017

(86) PCT No.: PCT/JP2017/024501
§ 371 (c)(1),
(2) Date: Dec. 27, 2018

(87) PCT Pub. No.: WO2018/008636
PCT Pub. Date: Jan. 11, 2018

(65) Prior Publication Data
US 2019/0315017 A1    Oct. 17, 2019

(30) Foreign Application Priority Data

Jul. 6, 2016    (JP) .............................. JP2016-134616

(51) Int. Cl.
*B29B 9/06*    (2006.01)
*B29B 7/90*    (2006.01)
(Continued)

(52) U.S. Cl.
CPC .................. *B29B 9/06* (2013.01); *B29B 7/90* (2013.01); *B29C 48/885* (2019.02);
(Continued)

(58) Field of Classification Search
CPC .... B29B 9/06; B29B 9/00; B29B 7/90; B29C 2948/92209
(Continued)

(56) References Cited

U.S. PATENT DOCUMENTS

| 5,242,289 A | 9/1993 | Forgash et al. |
| 6,110,406 A * | 8/2000 | Ishibashi ................... B29B 9/06 |
| | | 264/237 |
| 2006/0211780 A1 * | 9/2006 | Passaplan ................. B29B 9/12 |
| | | 521/60 |

FOREIGN PATENT DOCUMENTS

| DE | 102007050592 A1 | 4/2009 |
| JP | 55-074821 A | 6/1980 |

(Continued)

OTHER PUBLICATIONS

English Translation of Noritake (JP2004202815) (Year: 2004).*
(Continued)

*Primary Examiner* — Matthew J Daniels
*Assistant Examiner* — Hana C Page
(74) *Attorney, Agent, or Firm* — Locke Lord LLP

(57) ABSTRACT

The present invention aims to provide a method for producing a pellet and an apparatus for producing a pellet, including a conveyor belt that conveys a strand formed by melting a composition containing a thermoplastic resin and an additive and then ejecting the molten composition from a feeder, a liquid-spraying device spraying a liquid toward the strand conveyed, a gas-blowing device blowing a gas toward the strand conveyed, a strand cutter cutting the strand conveyed into a pellet, the liquid-spraying device, the gas-blowing device, and the strand cutter being disposed in this order in the conveying direction of the strand, a measurement device measuring a surface temperature of the strand, the measurement device being disposed upstream of the strand cutter in the conveying direction, and an adjustment
(Continued)

mechanism adjusting driving of at least one of the liquid-spraying device and the gas-blowing device in accordance with the surface temperature measured.

6 Claims, 4 Drawing Sheets

(51) Int. Cl.
  *B29C 48/885* (2019.01)
  *B29K 67/00* (2006.01)
  *B29K 509/02* (2006.01)
  *B29C 48/355* (2019.01)
  *B29C 48/04* (2019.01)
  *B29C 48/00* (2019.01)
  *B29C 48/92* (2019.01)

(52) U.S. Cl.
  CPC .......... *B29C 48/0022* (2019.02); *B29C 48/04* (2019.02); *B29C 48/355* (2019.02); *B29C 48/92* (2019.02); *B29C 2948/92209* (2019.02); *B29C 2948/92428* (2019.02); *B29C 2948/92704* (2019.02); *B29K 2067/003* (2013.01); *B29K 2509/02* (2013.01)

(58) Field of Classification Search
  USPC ....................................................... 264/40.1
  See application file for complete search history.

(56) References Cited

FOREIGN PATENT DOCUMENTS

| | | |
|---|---|---|
| JP | 04-269511 A | 9/1992 |
| JP | 2002-265027 A | 9/2002 |
| JP | 2004-202815 A | 7/2004 |
| JP | 2004-268421 A | 9/2004 |
| JP | 2006-159849 A | 6/2006 |
| JP | 2006-264325 A | 10/2006 |
| JP | 2011-173269 A | 9/2011 |
| WO | 2018/003773 A1 | 1/2018 |

OTHER PUBLICATIONS

Ishimaru, English Translation of JP2004202815 (Year: 2004).*
Nakada, English Translation of JP201117326 (Year: 2011).*
English Translation of Ishimaru (JP2006159849) (Year: 2006).*
"Thermal Infrared" (Available on Aug. 26, 2013) <https://maxmax.com/ThermalCamerasDifferences.htm> (Year: 2022).*
Siddharth Kalla (Jun. 10, 2011). Range (Statistics). Retrieved Jun. 17, 2022 from Explorable.com: https://explorable.com/range-in-statistics (Year: 2011).*
International Search Report dated Aug. 22, 2017, issued for PCT/JP2017/024501 and English translation thereof.
Office Action dated Feb. 6, 2018, issued for the Japanese patent application No. 2017-565323 and English translation thereof.
Supplementary European Search Report dated Jan. 23, 2020, issued European Patent Application No. 17824239.2.
Hui Zhang, "Condition Monitoring and Fault Diagnosis of Modem Paper Machinery," China Light Industry Press, May 2013, pp. 227-228 (cited in the Jan. 20, 2021 Office Action issued for CN201780039640.5).
Office Action dated Jan. 20, 2021, issued for the Chinese patent application No. 201780039640.5 and English translation thereof.

* cited by examiner

APPARATUS FOR PRODUCING PELLET AND METHOD FOR PRODUCING PELLET

TECHNICAL FIELD

The present invention relates to apparatuses for producing thermoplastic resin pellets and methods for producing thermoplastic resin pellets. More specifically, the present invention relates to an apparatus for producing a pellet and a method for producing a pellet, the apparatus and method being used for cooling a strand and cutting the cooled strand into pellets, the strand being formed by melting a thermoplastic resin or resin composition containing a thermoplastic resin with, for example, a kneader or an extruder (hereinafter, referred to as a "feeder") and ejecting the resulting melt therefrom.

BACKGROUND ART

A process for producing a thermoplastic resin product typically includes a primary step of mixing a resin material and additives, such as a glass fiber, a flame retardant, a release agent, and a colorant, kneading the mixture, and pelletizing the resulting mixture; and a secondary step of placing pellets formed in the primary step in an injection molding machine or the like, melting the pellets, and molding the resulting melt into a product shape with a mold.

The pellets formed in the primary step are preferably uniform in size, shape, and so forth from the viewpoint of efficiently performing the shaping in the subsequent secondary step. In general, a die having many small holes is attached to the outlet of a feeder, such as a single-screw extruder or a twin-screw extruder, and string-like strands are ejected and cut to form pieces having an appropriate length with a cutting machine, thereby producing granular pellets.

As a method for cutting the strands, a method is usually employed in which the strands are cooled while received in a water bath, the strands are pulled up from the water bath after solidification, introduced into the cutting machine, and cut into cylindrical pellets. In this method, however, the strands ejected from the outlet are overcooled and thus are hard and brittle, in some cases. For this reason, disadvantageously, the strands often break before being introduced into the cutting machine, thus decreasing the yield.

A method for producing a pellet with an apparatus for producing a pellet is known, the method including after spraying water toward a strand conveyed on a conveyor belt, blowing air to remove adhering water, and cutting the resulting strand into pellets, the apparatus including the conveyor belt that conveys the strand formed by melting a thermoplastic resin and ejecting the resulting melt from a feeder, a water-spraying device that sprays water toward the strand on the conveyor belt, an air-blowing device that removes adhering water, and a strand cutter that cuts the strand conveyed on the conveyor belt into the pellets (see PTL 1).

CITATION LIST

Patent Literature

PTL 1: Japanese Unexamined Patent Application Publication No. 2011-173269

SUMMARY OF INVENTION

Technical Problem

In the method described in the PTL 1, it is necessary to collect the pellets immediately after cutting and measure their temperature. This inevitably causes a time lag in the adjustment of the flow rate of water sprayed and the flow rate of air blown with respect to a change in pellet temperature. When continuous production is performed for a long time, it is impossible to cope with a change in the temperature of the strand attributed to, for example, a lack of stability in the preceding melting step, a change in outside air temperature, a slight change in the flow rate and angle of water sprayed or air blown, or a slight change in the temperature of water or air blown. Thus, the strand temperature is excessively higher or lower than an appropriate temperature control range, in some cases. In particular, the strand temperature did not stabilize for several hours from a startup and a restart; thus, the tendency is remarkably observed.

An excessively higher strand temperature tends to lead to quality degradation. For example, the strands in the molten state are fused to form bonded pellets. Insufficient solidification of the strands makes it difficult to cut the strands with a strand cutter, thus resulting in deformed pellets after cutting. An excessively low strand temperature tends to lead to low productivity because the strands are hard and brittle and thus broken. Furthermore, an excessively low strand temperature also tends to lead to quality degradation because defects due to a phenomenon in which the pellets are crashed at the time of cutting and a fine powder called as cutting dust are formed and because the cut surfaces of the pellets are easily chipped.

In response to the above issue, the present invention aims to provide a method for producing a pellet composed of a thermoplastic resin, the method suppressing the formation of bonded pellets, whiskers and defects of the cut surfaces of pellets, and cutting dust and providing the pellets having improved quality and improved productivity even if continuous production is performed for a long time. The present invention also aims to provide an apparatus for producing a pellet, the apparatus being useful for the production method.

Solution to Problem

The inventors have conducted intensive studies to solve the forgoing problems and have found that the foregoing problems can be solved by controlling the temperature of a strand itself during conveyance, i.e., adjusting the flow rate of the liquid sprayed or the temperature of the liquid sprayed in accordance with the measured surface temperature of the strand and by adjusting the flow rate of the gas blown or the temperature of the gas blown. These findings have led to the completion of the present invention.

The present invention relates to an apparatus for producing a pellet, the apparatus including a conveyor belt that conveys a strand formed by melting a composition containing a thermoplastic resin and an additive and then ejecting the molten composition from a feeder, at least one liquid-spraying device that sprays a liquid toward the strand conveyed on the conveyor belt, at least one gas-blowing device that blows a gas toward the strand conveyed on the conveyor belt, and a strand cutter that cuts the strand conveyed on the conveyor belt into a pellet, the at least one liquid-spraying device, the at least one gas-blowing device, and the strand cutter being disposed in this order in the conveying direction of the strand, a measurement device that measures the surface temperature of the strand, the measurement device being disposed upstream of the strand cutter in the conveying direction, and an adjustment mechanism that adjusts driving of at least one of the at least one liquid-spraying device and the at least one gas-blowing device in accordance with the surface temperature measured with the measurement device.

The present invention relates to a method for producing a pellet, the method including the steps of conveying a strand on a conveyor belt, the strand being formed by melting a composition containing a thermoplastic resin and an additive and then ejecting the molten composition from a feeder, spraying a liquid toward the strand on the conveyor belt, blowing a gas toward the strand on the conveyor belt, cutting the strand conveyed by the conveyor belt into a pellet, measuring the surface temperature of the strand at a position before cutting the strand, and adjusting at least one of spraying the liquid and blowing the gas in accordance with the measured surface temperature of the strand.

Advantageous Effects of Invention

According to the present invention, the method for producing a pellet composed of a thermoplastic resin can be provided, the method suppressing the formation of bonded pellets, whiskers and defects of the cut surfaces of pellets, and cutting dust and providing the pellets having improved quality and improved productivity even if continuous production is performed for a long time. Furthermore, an apparatus for producing a pellet can be provided, the apparatus being useful for the production method.

DESCRIPTION OF EMBODIMENTS

Figure 1:
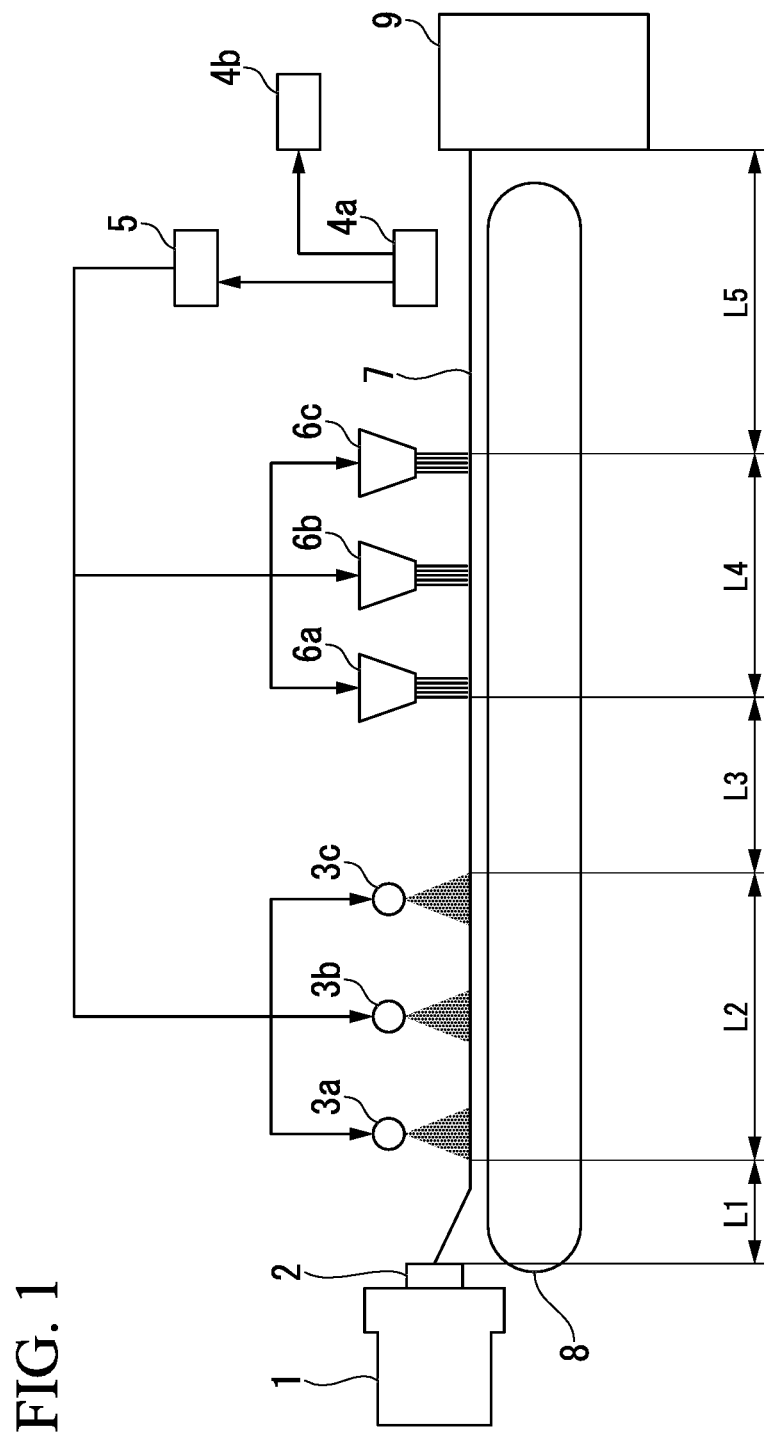
FIG. 1 illustrates an embodiment of the present invention and is a schematic diagram of an apparatus for producing a pellet.

A method according to the present invention for producing a pellet composed of a thermoplastic resin composition and an apparatus according to the present invention for producing a pellet, the apparatus being used for the production method, will be described. The apparatus for producing a pellet includes a conveyor belt, a liquid-spraying device, a gas-blowing device, a strand cutter, a measurement device, and an adjustment mechanism. The liquid-spraying device, the gas-blowing device, and the strand cutter are arranged in this order in the direction of a strand conveyed by the conveyor belt. Hereinafter, the conveyor belt and a conveyance step, the liquid-spraying device and a liquid spraying step, the measurement device and a surface temperature measurement step, the adjustment mechanism and a cooling condition adjustment step, and the strand cutter and a cutting step will be described in this order.

(1) A step of conveying a strand on the conveyor belt, the strand being formed by melting a composition containing a thermoplastic resin and an additive and then ejecting the molten composition from a feeder, and the conveyor belt will be described.

As the thermoplastic resin, all common thermoplastic resins produced in the form of pellets from strands are exemplified. Examples thereof include polyolefin resins such as polyethylene and polypropylene and modified products thereof; polyester resins such as poly(ethylene terephthalate) and poly(butylene terephthalate); (meth)acrylic resins such as poly(methyl methacrylate) and poly(ethyl methacrylate); styrene resins such as polystyrene, acrylonitrile-butadiene-styrene resins, acrylonitrile-acrylic rubber-styrene resins, acrylonitrile-ethylene rubber-styrene resins, (meth)acrylate-styrene resins, and styrene-butadiene-styrene resins; ionomer resins; polyacrylonitrile; polyamide resins such as 6-nylon, 6,6-nylon, 6T-PA, 9T-PA, and MXD6-nylon; ethylene-vinyl acetate resins; ethylene-acrylic resins; ethylene-ethyl acrylate resins; ethylene-vinyl alcohol resins; chlorine-containing resins such as poly(vinyl chloride) and poly(vinylidene chloride); fluorocarbon resins such as poly (vinyl fluoride) and poly(vinylidene fluoride); polycarbonate resins; modified poly(phenylene ether) resins; methylpentene resins; cellulose resins; and thermoplastic elastomers such as olefinic elastomers, glycidyl-modified olefinic elastomer, maleic acid-modified olefinic elastomers, vinyl chloride-based elastomers, styrene-based elastomers, urethane-based elastomers, polyester-based elastomers, and polyamide-based elastomers. These thermoplastic resins may be used alone or in combination of two or more thereof. Regarding a thermoplastic resin having a melting point of 220° C. or higher, what is called an engineering plastic, a temperature difference in cooling from the melting temperature thereof to room temperature is large, and the temperature gradient during the cooling is large, making it very difficult to control the temperatures. Thus, the method according to the present invention can be particularly preferably employed for the engineering plastic. Examples of the engineering plastic include poly(butylene terephthalate), nylon9T, fluorocarbon resins, polycarbonate resins, modified poly(arylene ether) resins, poly(ether imide) resins, poly(ether ether ketone) resins, and thermoplastic polyimide resins.

Examples of an additive that may be used in the present invention include fillers, hydrolysis inhibitors, colorants, flame retardants, antioxidants, polyethylene waxes, oxidized polyethylene waxes, polypropylene waxes, oxidized polypropylene waxes, metallic soaps, styrene-based oligomers, polyamide-based oligomers, polymerization initiators, polymerization inhibitors, titanium-based crosslinkers, zirconia-based crosslinkers, other crosslinkers, ultraviolet absorbers, antistatic agents, lubricants, release agents, defoamers, levelling agents, light stabilizers (for example, benzotriazoles, hindered amines), crystal nucleating agents, chelating agents, ion exchangers, dispersants, antioxidants, inorganic pigments, organic pigments, and coupling agents.

Examples of fillers that may be used in the present invention include fibrous fillers and non-fibrous fillers having plate-like, scale-like, granular, indefinite, and crushed forms. Specific examples thereof include glass fibers, milled glass fibers, flat glass fibers, modified cross-section glass fibers, cut glass fibers, metal fibers such as stainless-steel fibers, aluminum fibers, and brass fibers, organic fibers such as aromatic polyamide fibers and Kevlar fibrils, gypsum fibers, ceramic fibers, asbestos fibers, zirconia fibers, alumina fibers, silica fibers, titanium oxide fibers, silicon carbide fibers, E glass (plate-like, scale-like, granular, indefinite, or crushed form), H glass (plate-like, scale-like, granular, indefinite, or crushed form), A glass (plate-like, scale-like, granular, indefinite, or crushed form), C glass (plate-like, scale-like, granular, indefinite, or crushed form), natural silica glass (plate-like, scale-like, granular, indefinite, or crushed form), synthetic silica glass (plate-like, scale-like form, granular form, indefinite form, or crushed form), rock wool, hydrated alumina (whiskers or plate-like forms), potassium titanate whiskers, barium titanate whiskers, aluminum borate whiskers, silicon nitride whiskers, talc, kaoline, silica (crushed or spherical form), quartz, calcium carbonate, zinc carbonate, mica, glass beads, glass flakes, crushed or indefinite glass, glass microballoons, clay, molybdenum disulfide, wollastonite, metal oxides such as aluminum oxide (crushed form), light-transmitting alumina (fibrous, plate-like, scale-like, granular, indefinite, or crushed form), and titanium oxide (crushed form), zinc oxide (fibrous, plate-like, scale-like, granular, indefinite, or crushed form), metal hydroxides such as aluminum hydroxide (fibrous, plate-like, scale-like, granular, indefinite, or crushed form), aluminum nitride, light-transmitting aluminum nitride (fibrous, plate-like, scale-like, granular, indefinite, or crushed form), calcium polyphosphate, graphite, metal powders, metal flakes, metal ribbons, and metal oxides.

Specific examples of metal materials of metal powders, metal flakes, and metal ribbons that may be used in the present invention include silver, nickel, copper, zinc, aluminum, stainless steel, iron, brass, chromium, and tin. Examples of (B) inorganic fillers include carbonaceous fillers such as carbon powders, graphite, carbon flakes, scale-like carbon, carbon nanotubes, and PAN- and pitch-based carbon fibers. These fillers may be used in combination of two or more thereof. In particular, glass fibers, glass beads, glass flakes, and calcium carbonate are preferably used.

Examples of coupling agents that may be used in the present invention include silane coupling agents and titanate coupling agents. Examples of the silane coupling agents include vinyltrimethoxysilane, vinyltriethoxysilane, 2-(3,4-epoxycyclohexyl)ethyltrimethoxysilane, 3-glycidoxypropyltrimethoxysilane, 3-glycidoxypropyltriethoxysilane, 3-glycidoxypropylmethyldiethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3aminopropylmethyldimethoxysilane, N-2-(aminoethyl)-3aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-mercaptopropyltrimethoxysilane, bis(triethoxysilylpropyl)tetrasulfide, and 3-isocyanatopropyltriethoxysilane. Examples of the titanate coupling agents include isopropyltriisostearoyl titanate, isopropyltrioctanoyl titanate, isopropyltri(dioctyl pyrophosphate) titanate, isopropyldimethacrylisostearoyl titanate, isopropyltri(N,N-diaminoethyl) titanate, isopropyltridodecylbenzenesulfonyl titanate, isopropylisostearoyldiacryl titanate, isopropyltri(dioctyl phosphate) titanate, isopropyltricumylphenyl titanate, tetraisopropylbis(dioctyl phosphate) titanate, tetraoctylbis(ditridecyl phosphate) titanate, tetra(2,2-diallyloxymethyl-1-butyl)bis(ditridecyl) phosphate titanate, bis(dioctyl pyrophosphate) oxyacetate titanate, and bis(dioctyl pyrophosphate) ethylene titanate.

In the present invention, the proportion of the additive with respect to the thermoplastic resin is not particularly limited as long as the advantageous effect of the present invention is not impaired. The proportion of the additive is in the range of 0.01 to 1,000 parts by mass, preferably 0.1 to 500 parts by mass, more preferably 0.5 to 200 parts by mass, even more preferably 0.1 to 100 parts by mass based on 100 parts by mass of the thermoplastic resin. The additive may be incorporated in a proportion sufficient to provide an intended effect, and the resulting mixture may be melt-kneaded with a feeder such as an extruder.

The resin composition containing the thermoplastic resin and the additive may be melted by any known method without limitation. For example, the resin composition may be melted by a method in which the resin composition is kneaded with a feeder such as a planetary mixer, a Disper, a planetary mixer, a three-roll mill, a ribbon blender, a drum tumbler, a Henschel mixer, a Banbury mixer, a single-screw extruder, a twin-screw extruder, a pressure kneader, a co-kneader, or a multi-screw extruder while heated in such a manner that the resin temperature is equal to or higher than the melting point of the thermoplastic resin.

The operation conditions of the feeder, for example, the temperature of a barrel portion, the rotational speed of a screw, the presence or absence of a vent, and so forth, are appropriately determined in accordance with, for example, the properties of the thermoplastic resin, the filler, and the additive added as needed and the extrusion output. A die having many holes is disposed at the ejection portion of the feeder. A mixture of the thermoplastic resin, the filler, and the additive added as needed is melt-kneaded to form a thermoplastic resin composition, and strands composed of the thermoplastic resin composition are ejected from the ejection portion.

The number of the strands ejected is preferably, but not necessarily, in the range of 1 to 100, more preferably 5 to 50, particularly preferably 10 to 35. The diameter of each of the strands is not particularly limited as long as the advantageous effect of the present invention is not impaired. In view of productivity in consideration of cooling capability, the diameter of each of the strands is preferably in the range of 0.5 to 10 (mm), more preferably 1 to 5 (mm). The extrusion rate of the strands from the feeder is not particularly limited as long as the advantageous effect of the present invention is not impaired. Typically, the extrusion rate is preferably in the range of 5 to 500 m/min, more preferably 10 m/min to 100 m/min, even more preferably 20 to 50 m/min.

The resin composition containing the molten thermoplastic resin and the additive is then ejected from the feeder in the form of strands, and the strands are conveyed by the conveyor belt.

Examples of the material of the conveyor belt include metals and resins. In the case where the material of the conveyor belt is a metal, a material such as stainless steel or an alloy containing titanium or zirconium, which is resistant to rust and corrosion due to a liquid or the like sprayed from the liquid-spraying device, is preferably used. Additionally, in the case where the metal is used, the metal preferably has a mesh shape because the gas can pass through the conveyor belt in the gas-blowing step to suppress the disturbance of the strands attributed to the turbulence of the gas flow, such as the bouncing of the gas, and because the strands are pressed down by the blowing gas to improve the strand-conveying characteristics. The openings and type of the metal mesh are not particularly limited. The metal mesh preferably has openings smaller than the thickness of the strands. As the metal mesh, a perforated metal or a metal mesh woven from metal wire may be used. The metal mesh woven from metal wire is preferred because of its good flexibility and good rotatability.

In the case where the material of the conveyor belt is a resin, examples of the resin include polyester resins, polyolefin resins, polyimide resins, polyamide resins, aramid resins, poly(amide imide) resins, polyurethane resins, fluorocarbon resins, silicone resins, and other various rubbery resins.

The conveying speed of the strands on the conveyor belt is not particularly limited as long as the advantageous effect of the present invention is not impaired. Usually, the conveying speed is preferably equal to the extrusion rate of the strands from the feeder.

The angle of the conveyor belt is not particularly limited as long as the advantageous effect of the present invention is not impaired. The angle is preferably 0° to 20°, more preferably more than 0° to 3° upward with respect to the traveling direction from the viewpoints that the cooling liquid removed from the strands is suppressed from flowing toward the strand cutter and good strand-conveying characteristics are provided. An angle of more than 0° upward enables the sprayed liquid to be recovered.

(2) A step of spraying the liquid toward the strands on the conveyor belt and the liquid-spraying device will be described.

The present invention includes the step of spraying the liquid toward each strand on the conveyor belt in order to attach the liquid to the surface of the strand and cool the strand by heat exchange between the strand and the liquid and by the heat of vaporization of the liquid. The liquid is sprayed with the liquid-spraying device through a spray nozzle fixed with a bolt or the like to a position at which the liquid can be sprayed on the strand on the conveyor belt. As the liquid-spraying device, any known device capable of spraying a cooling liquid may be used. Examples of the shape of a spray area include circular shapes, elliptic shapes, linear shapes, and rectangular shapes. The distance between the spray nozzle and the strand (spray area) is preferably, but not necessarily, in the range of 10 to 1,000 mm, more preferably 50 to 500 mm, even more preferably 100 mm to 250 mm. In the case where multiple strands are conveyed on the conveyor belt, the spraying is preferably performed in such a manner that the strands have a uniform surface temperature by adjusting the spray area where the strands are subjected to spraying. If the strands have significantly different surface temperatures, uniform pellets are not formed, and the breakage of the strands, the formation of the whiskers, or the formation of defects of the cut surfaces of pellets tends to occur. In FIG. 1, three liquid-spraying devices are arranged at regular intervals. However, the present invention is not limited thereto. Preferably, the number of the liquid-spraying devices is appropriately adjusted in the range of 1 to 10. Examples of the liquid sprayed from the liquid-spraying device include water, organic solvents such as alcohols, ethylene glycol, and acetone; and acids such as formic acid and acetic acid. Water is preferred in view of productivity. The temperature of the liquid sprayed from the liquid-spraying device (hereinafter, referred to as a "liquid temperature") is preferably room temperature (which varies depending on the season and place and is in the range of about 15° C. to about 23° C. on average). However, in the case where the liquid temperature of the liquid sprayed is adjusted, liquids having different temperatures ranging from 1° C. to 50° C. with respect to room temperature may be used in combination.

In the liquid-spraying device, the flow rate of the liquid sprayed per unit time is preferably in the range of 0.1 to 50 ml/min, more preferably 1 to 10 ml/min per one strand.

The liquid-spraying device includes an adjustment mechanism (liquid cooling adjustment mechanism) to adjust the flow rate of the liquid sprayed or the liquid temperature. In the liquid-spraying device, the adjustment mechanism to adjust the flow rate of the liquid sprayed can continuously or stepwise adjust the flow rate and the pressure of a liquid flowing through a pipe communicating with the spray nozzle of the liquid-spraying device by opening or closing a valve or adjusting the valve opening with a solenoid operated valve, a motor operated valve, a proportional valve, or the like. Owing to the adjustment mechanism to adjust the liquid temperature of the liquid sprayed, the liquid adjusted so as to have a desired temperature can be sprayed through the spray nozzle by a method in which at least two liquid tanks having different temperatures are placed inside or outside the liquid-spraying device and the flow rates are adjusted with, for example, proportional valves in such a manner that a desired preset temperature is obtained, or by supplying a heat source such as electricity or steam from the outside and adjusting the flow rate of the heat source flowing into a heat exchanger or the like. In the case where liquid-spraying devices or spray nozzles may be used in the strand conveying direction, the flows of the liquid sprayed from different liquid-spraying devices or spray nozzles are set so as to have different temperatures, and the spraying may be performed in such a manner that the strand has a desired preset temperature while the spraying is adjusted by adjusting the flow rate of the liquid sprayed from each of the liquid-spraying devices or the spray nozzles. Similarly, in the case where the liquid-spraying devices or the spray nozzles may be used, the flow rate of the liquid sprayed from each of the liquid-spraying devices or the spray nozzles is set so as to be independently adjustable, and the flow rate of the liquid sprayed from each of the liquid-spraying devices or the spray nozzles may be adjusted in such a manner that the strand has a desired preset temperature. Additionally, in the case where the liquid-spraying devices or the spray nozzles may be used, the flow rate of the liquid on the upstream side may be increased, the flow rate of the liquid on the downstream side may be lower than that on the upstream side while the liquid temperature is lowered, or the liquid temperature may be higher than that on the upstream side. In this case, the strand can be rapidly cooled by spraying the liquid from the liquid-spraying device or the spray nozzle on the upstream side, and the strand can be slowly cooled by spraying the liquid from the liquid-spraying device or the spray nozzle on the downstream side. Thus, the surface temperature of the strand after the spraying of the liquid can be more accurately controlled.

Regarding the spray angle of the spray nozzle, in the case where the liquid is sprayed over the entire width of the conveyor belt through a single spray nozzle, the spray angle of the spray nozzle is selected in accordance with the width of the conveyor belt and the distance between the conveyor belt and the spray nozzle. In the case where the liquid is sprayed over the entire width of the conveyor belt through spray nozzles, if the spray areas on the conveyor belt are separated, the strand has a portion where the liquid is not sprayed. If the spray areas on the conveyor belt overlap, the strand can be sprayed with the liquid from adjacent spray nozzles. Thus, the spray nozzles are preferably arranged in such a manner that the spray areas on the conveyor belt are in contact with each other in order to achieve uniform cooling characteristics for the strand in the width direction of the conveyor belt. In the case where the shape of the spray area is noncircular, the cooling characteristics for the strand can be made uniform by arranging the spray nozzles rotatably around an axis parallel to the vertical direction and rotating the spray nozzles in such a manner that adjacent spray areas in the width direction of the conveyor belt are in contact with each other. In the case where the liquid-spraying devices or the spray nozzles are arranged in the width direction of the conveyor belt, each of them may be arranged so as to correspond to a corresponding one of the strands.

Alternatively, the strands are divided into groups, and each of the liquid-spraying devices or the spray nozzles may be arranged for each group. In either case, by allowing the spraying of the liquid from each of the liquid-spraying devices or the spray nozzles to be independently adjustable, optimal spray cooling can be performed in accordance with the surface temperature of each strand or the surface temperature of each strand group.

"A distance between a position where each strand is ejected from the ejection port of the feeder and a position where the strand comes first into contact with the liquid sprayed from the liquid-spraying devices" (L1) is preferably, but not necessarily, in the range of 10 to 1,000 mm, more preferably 50 mm to 500 mm from the viewpoints of suppressing the slippage of the strand on the conveyor belt and suppressing the fusion of the strands.

A distance (L2) is defined by subtracting "the distance between the position where the strand is ejected from the ejection port of the feeder and the position where the strand comes first into contact with the liquid sprayed from the liquid-spraying devices" from "a distance between the position where the strand is ejected from the ejection port of the feeder and a position where the strand comes last into contact with the liquid sprayed from the liquid-spraying devices". The distance (L2) is preferably in the range of 500 to 2,000 mm, more preferably 1,000 to 1,500 mm in order to sufficiently spray the liquid to the strand.

After the sprayed liquid is recovered and subjected to purification and so forth with a filter, the liquid can be reused for spray application and so forth.

(3) A step of blowing a gas toward the strand on the conveyor belt and the gas-blowing device will be described.

The present invention includes the step of blowing a gas toward the strand on the conveyor belt in order to remove the liquid attached to the surface of the strand. The gas blowing is performed with the gas-blowing device fixed with a bolt or the like to a position at which the gas can be blown on the strand on the conveyor belt. The gas-blowing device is a device that removes the liquid attached to the strand and that air-cools the strand. A known air-blowing device or drying device may be used. A known gas-blowing device which is capable of controlling the temperature of the gas and into which a gas flow adjustment mechanism, a heater, or a cooling device is incorporated may be used as an adjustment mechanism to adjust the flow rate of the gas blown or the temperature of the gas (gas cooling adjustment mechanism). In the case where gas-blowing devices may be used or where the gas-blowing device may have outlet ports, the flows of the gas blown from the devices or the outlet ports are set so as to have different temperatures, and then the gas may be blown in such a manner that the strand has a desired preset temperature by adjusting the flow rate of the gas blown from each of the gas-blowing device or the outlet ports. Similarly, in the case where the gas-blowing devices or the outlet ports may be used, the flow rate of the gas from each of the devices or the outlet ports is set so as to be independently adjustable, and then the flow rate of the gas blown from each of the devices or the outlet ports may be adjusted in such a manner that the strand has a desired preset temperature. Additionally, in the case where the gas-blowing devices or the outlet ports may be used, the flow rate of the gas on the upstream side may be increased, the flow rate of the gas on the downstream side may be lower than that on the upstream side while the gas temperature is lowered, or the gas temperature may be higher than that on the upstream side. In this case, the strand can be rapidly cooled by blowing the gas from the gas-blowing device or the outlet ports on the upstream side, and the strand can be slowly cooled by blowing the gas from the gas-blowing device or the outlet ports on the downstream side. Thus, the surface temperature of the strand after the blowing of the gas can be more accurately controlled.

Regarding the blowing angle of the gas, preferably, but not necessarily, an apparatus for blowing the gas downward from above is used in order to remove the liquid attached to the surface of the strand. Examples of the shape of a blowing area include circular shapes, elliptic shapes, linear shapes, and rectangular shapes. For the blowing angle of the gas in consideration of cooling by blowing, in the case where the gas is blown over the entire width of the conveyor belt through a single outlet port, the blowing angle is selected in accordance with the width of the conveyor belt and the distance between the conveyor belt and the outlet port. In the case where the gas is blown over the entire width of the conveyor belt through the outlet ports, if the blowing areas on the conveyor belt are separated, the strand has a portion where the gas is not blown. If the blowing areas on the conveyor belt overlap, the strand can be blown with the gas from adjacent outlet ports. Thus, the outlet ports are preferably arranged in such a manner that the blowing areas on the conveyor belt are in contact with each other in order to achieve uniform cooling characteristics for the strand in the width direction of the conveyor belt. In the case where the shape of the blowing area is noncircular, the cooling characteristics for the strand can be made uniform by arranging the outlet ports rotatably around an axis parallel to the vertical direction and rotating the outlet ports in such a manner that adjacent blowing areas in the width direction of the conveyor belt are in contact with each other. In the case where the gas-blowing device or the outlet ports are arranged in the width direction of the conveyor belt, each of them may be arranged so as to correspond to a corresponding one of the strands. Alternatively, the strands are divided into groups, and each of the gas-blowing devices or the outlet ports may be arranged for each group. In either case, by allowing the blowing of the gas from each of the gas-blowing devices or the outlet ports to be independently adjustable, optimal blowing cooling can be performed in accordance with the surface temperature of each strand or the surface temperature of each strand group.

In the case where multiple strands are conveyed, the liquid attached to the surfaces is preferably removed while the blowing is performed in such a manner that the surface temperature of each of the strands is more uniform by adjusting the blowing area. If individual strands have significantly different surface temperatures, uniform pellets are not formed, and the breakage of the strands, the formation of defects of the cut surfaces of pellets, or the formation of cutting dust tends to occur. In FIG. 1, three gas-blowing devices are arranged at regular intervals in the strand conveying direction. However, the present invention is not limited thereto. Preferably, the number of the gas-blowing devices is appropriately adjusted in the range of 1 to 10. The velocity and the flow rate of the gas blown are not particularly limited as long as the temperature of the strand can be adjusted in a predetermined range and the liquid attached to the strand surface can be removed. Preferably, the velocity and the flow rate are such that the strand does not meander. As the gas blown, an inert gas such as nitrogen or argon may be used. The atmosphere (air) is preferred from the viewpoint of productivity. The temperature of the gas blown from the gas-blowing device need not be particularly limited as long as the temperature of the strand can be adjusted in a predetermined range and the liquid attached to the strand surface can be removed. The temperature of the strand is preferably in the range of (room temperature−30° C.) to (room temperature+30° C.), more preferably (room temperature−15° C.) to (room temperature+15° C.)

In the gas-blowing device, the flow rate of the gas blown per unit time is preferably in the range of 0.1 to 5 L/s, more preferably 0.3 to 1.5 L/s per one strand.

A distance (L3) is defined by subtracting "the distance between the position where the strand is ejected from the ejection port of the feeder and the position where the strand comes last into contact with the liquid sprayed from the liquid-spraying devices" from "a distance between the position where the strand is ejected from the ejection port of the feeder and a position where the strand comes first into contact with the gas blown from the gas-blowing devices". The distance (L3) is preferably in the range of 200 to 600 mm, more preferably 200 to 500 mm in order not to allow the gas blown to affect the spraying of the liquid.

A distance (L4) is defined by subtracting "the distance between the position where the strand is ejected from the ejection port of the feeder and the position where the strand comes first into contact with the gas blown from the gas-blowing devices" from "a distance between the position where the strand is ejected from the ejection port and a position where the strand comes last into contact with the gas blown from the gas-blowing devices". The distance (L4) is preferably in the range of 200 to 2,000 mm, more preferably 200 to 1,500 mm from the viewpoint of preventing interference between the flows of the gas.

A distance (L5) is defined by subtracting "the distance between the position where the strand is ejected from the ejection port of the feeder and the position where the strand comes last into contact with the gas blown from the gas-blowing devices" from "a distance between the ejection port of the feeder and the strand cutter". The distance (L5) is preferably in the range of 500 to 2,000 mm, more preferably 800 to 1,500 mm from the viewpoints of stabilizing the temperature, addressing a problem associated with the conveying of the strand (work space for the introduction of the strand into the cutter at the time of startup or strand breakage), and ensuring a space for the measurement of the surface temperature of the strand.

(4) A step of measuring the surface temperature of the strand and the measurement device that measures the surface temperature of the strand will be described.

The present invention includes the step of measuring the surface temperature of the strand. The measurement device that measures the surface temperature of the strand may be located at a position before the strand cutter (upstream in the strand conveying direction). The measurement device may be arranged between the liquid-spraying device and the gas-blowing device or between the gas-blowing device and the strand cutter. The measurement devices may be arranged between the liquid-spraying device and the gas-blowing device and between the gas-blowing device and the strand cutter. Preferably, the measurement device that measures the surface temperature of the strand can measure the surface temperature of the strand right in front of the strand cutter. The preferred installation position of the measurement device cannot be generally specified because it also depends on the conveying speed of the strand. The measurement device preferably can measure the surface temperature of the strand located at a position 0.1 to 100 mm, more preferably 1 to 50 mm away from the strand cutter. In the case where multiple strands are formed, preferably, the strands are simultaneously measured. The installation position of the measurement device is not particularly limited as long as the surface temperature can be measured in such a way.

For example, any known measurement device that can measure the temperature by non-contact measurement of infrared radiation generated from the surface of each strand may be used as the measurement device that measures the surface temperature of the strand.

Figure 2:
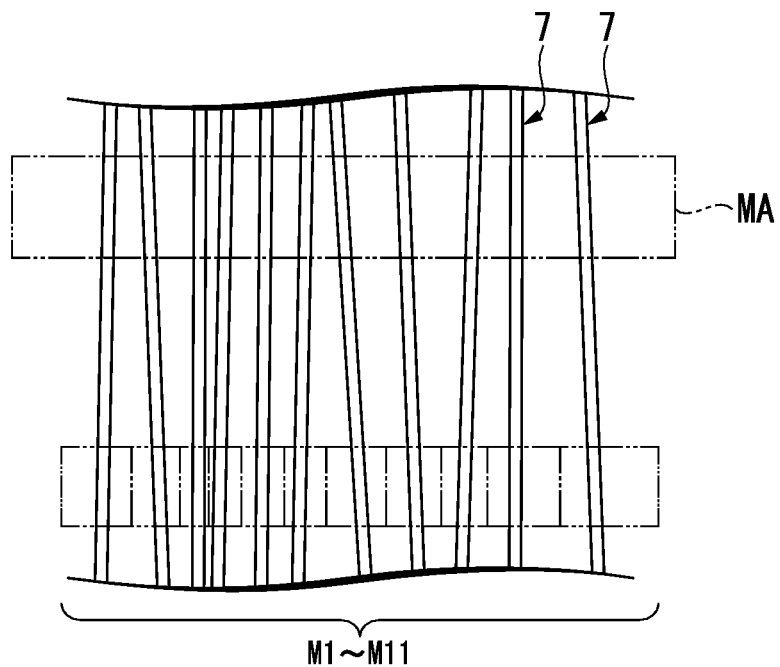
FIG. 2 illustrates an example of measurement areas of a measurement device for strands 7.
Figure 3:
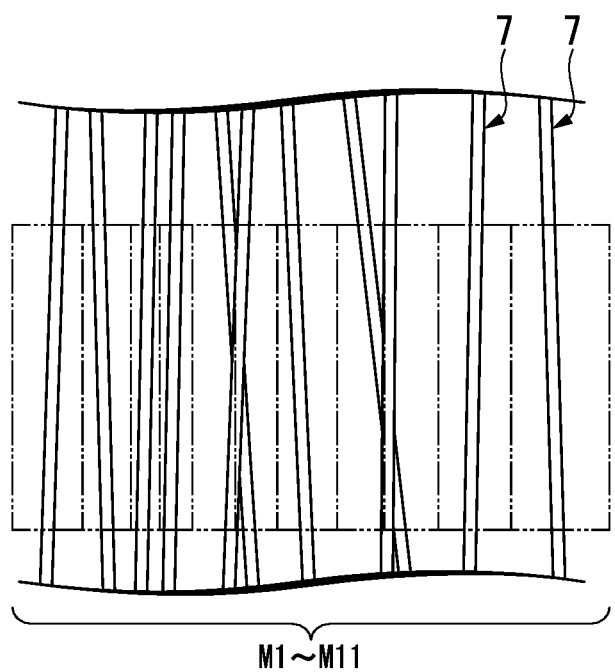
FIG. 3 illustrates an example of measurement areas of the measurement device for the strands 7.
Figure 4:
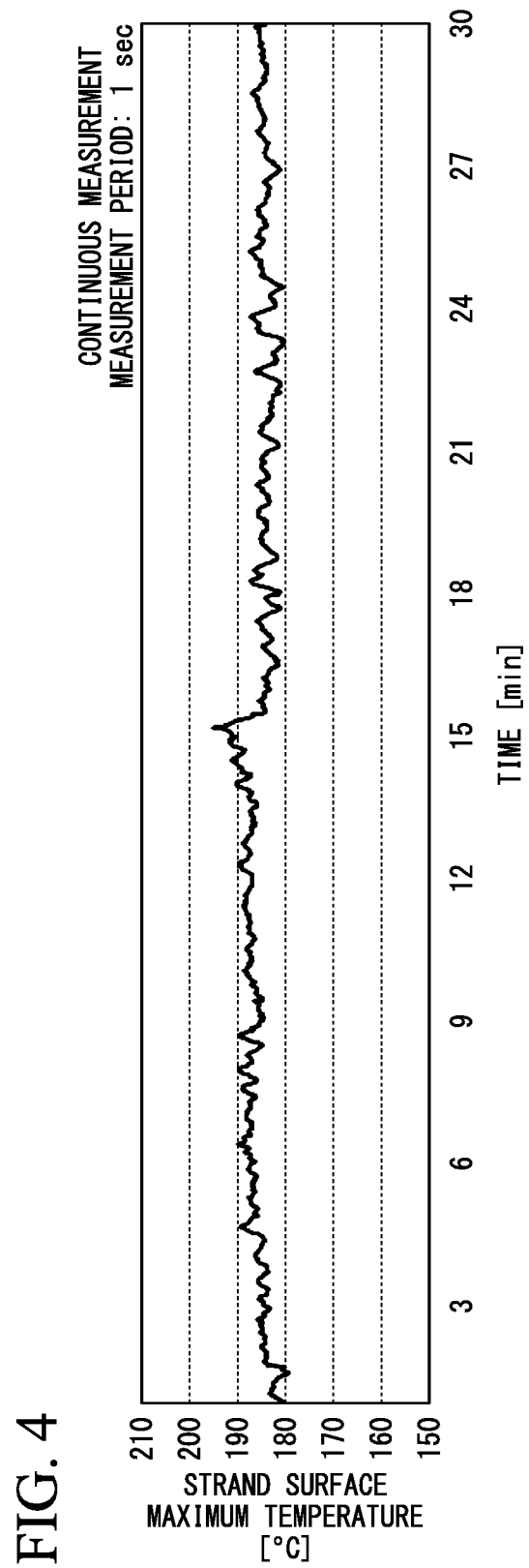
FIG. 4 illustrates fluctuations in strand surface temperature (maximum temperature) measured with a measurement device in Example 5 (the temperature was measured at a measurement period of 1 second, and the measured values from startup to 30 minutes were plotted).
Figure 5:
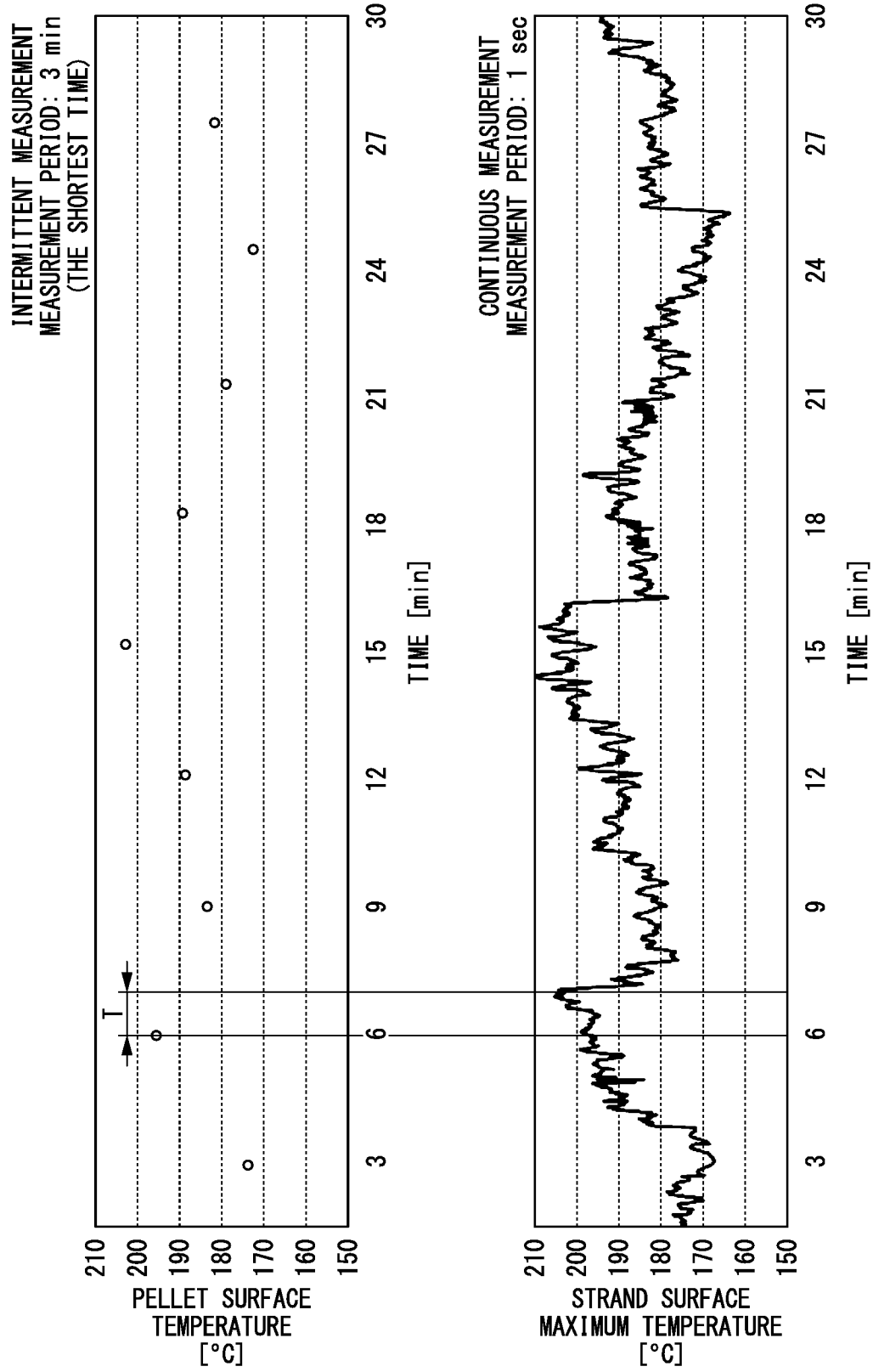
FIG. 5 illustrates an upper graph depicting fluctuations in pellet surface temperature (measurement was performed at three points each time at a measurement period of 3 minutes, and the average of the temperatures at the three points was used as a measured value and plotted) and a lower graph depicting fluctuations in strand surface temperature (maximum temperature) (the temperature was measured at a measurement period of 1 second, and the measured values from startup to 30 minutes were plotted) measured with a measurement device in Comparative example 5, the time axis of the upper graph being matched to that of the lower graph.

In the present invention, the surface temperature of the strand is measured in one or more measurement areas. Preferably, the surface temperature of the strand is measured in multiple measurement areas. The number, size, and positions of the measurement areas can be freely set in predetermined ranges. FIG. 2 illustrates an example of measurement areas of a measurement device for strands 7. In FIG. 2, eleven strands 7 are illustrated as an example. In a measurement area MA, the maximum temperature of the temperatures of all the strands 7 is collectively measured in the width direction of the conveyor. In measurement areas M1 to M11, the maximum temperatures of the respective strands 7 are measured. The maximum temperatures in the measurement areas MA and M1 to M11 that have temperatures exceeding a predetermined target measurement temperature (measurement lower limit) are individually measured. By setting the predetermined target measurement temperature, the background temperature other than the strands 7 can be ignored. As illustrated in FIG. 3, vibrations and so forth during conveyance may cause some strands to move to positions below other strands in the width direction of the conveyor, thereby making it difficult to accurately perform the measurement. By extending the measurement range of each of the measurement areas M1 to M11 in the conveying direction, the maximum temperature of each of the portions of the strands that do not intersect with other strands 7 can be measured. To extend the measurement range in the conveying direction, each of the measurement areas M1 to M11 may include a group of measurement portions arranged at intervals in the conveying direction, in addition to extending the length of each of the measurement areas M1 to M11. The surface temperatures of the strands measured with the measurement device are output to the adjustment mechanism.

(5) A step of adjusting cooling conditions on the basis of the measured surface temperatures of the strands will be described.

The present invention includes the step of adjusting the cooling conditions of the strands on the basis of the measurement results of the surface temperatures of the strands. The cooling conditions are adjusted with the adjustment mechanism on the basis of the measurement results of the maximum temperatures of the surface temperatures of the respective strands. The adjustment mechanism adjusts the driving of at least one of the liquid-spraying device and the gas-blowing device on the basis of the maximum temperatures of the surface temperatures of the respective strands to adjust the cooling conditions of the strands. The maximum temperatures measured in the measurement areas M1 to M11 are used to determine a maximum strand temperature referenced for the adjustment of the cooling conditions. The maximum strand temperature may be selected from (a) the highest temperature value of the maximum surface temperatures of the respective strands, (b) the lowest temperature value of the maximum surface temperatures of the respective strands, and (c) the average temperature of the maximum surface temperatures of the respective strands. Regarding the thresholds of a set temperature range previously determined in accordance with the type of thermoplastic resin are used to start and stop the adjustment of the cooling conditions, for example, the highest value of the strand surface temperatures may be selected as a high-temperature-side threshold based on the melting point of the strands, and the lowest value of the surface temperatures of the strands may be selected as a low-temperature-side threshold based on the melting point of the strands.

Regarding the set temperature range previously determined in accordance with the type of thermoplastic resin, separately, experiments and so forth are conducted to evaluate the states of the strands (the states of the breakage of the strands and the fusion of the strands), the quality of the pellets (the state of the formation of bonded pellets, the shape of the pellets, the state of the formation of the defects and cutting dust, and so forth), and the state of the formation of cutting dust in accordance with the surface temperatures of the strands, and the set temperature range may be appropriately set. For example, Table 1 presents exemplary ranges.

TABLE 1

| | Preferred temperature range [° C.] | More preferred temperature range [° C.] |
|---|---|---|
| Polyethylene terephthalate) | 90-140 | 95-135 |
| Polypropylene | 40-80 | 45-75 |
| Polyamide | 80-120 | 85-115 |
| Polystyrene | 70-120 | 75-115 |
| Poly(ether ether ketone) | 140-200 | 145-195 |
| Poly(arylene sulfide) | 170-200 | 175-195 |
| LGP (polyester containing p-hydroxybenzoic acid and 6-hydroxy-2-naphthoic acid as monomeric components) | 180-280 | 185-275 |

However, in the case where the measurement device is arranged only between the gas-blowing device and the strand cutter, because the measurement position of the surface temperatures of each strand with the measurement device is downstream of a position where the liquid is sprayed and a position where the gas is blown, after the surface temperature higher than the threshold is measured, cooling adjustment for the strand located at least between the position where the gas is blown and the measurement position cannot be performed, in some cases. Thus, the high-temperature-side threshold and the low-temperature-side threshold are preferably set in view of a change in the temperature of the strand during the conveyance from the position where the gas is blown to the measurement position when the cooling adjustment by the gas blowing is performed, or in view of a change in the temperature of the strand during the conveyance from the position where the liquid is sprayed to the measurement position when the cooling adjustment by the gas blowing is not performed.

A comparison is made between the case where the surface temperature of the strand is higher than the high-temperature-side threshold and the case where the surface temperature of the strand is lower than the low-temperature-side threshold. A surface temperature of lower than the low-temperature-side threshold results in lower productivity and a higher degree of quality failure. Thus, in the case where the measurement results of the surface temperatures of the strands include both of a surface temperature of higher than the high-temperature-side threshold and a surface temperature of lower than the low-temperature-side threshold, preferably, the cooling adjustment for the case where the surface temperature is lower than the low-temperature-side threshold is preferentially performed.

The cooling of the strands with the liquid-spraying device is performed by adjusting at least one of the flow rate of the liquid sprayed and the liquid temperature. Regarding the cooling of the strands using the liquid temperature of the liquid sprayed or the cooling of the strands using the flow rate of the liquid sprayed (appropriately referred to collectively as "spray cooling"), the correlation between the spray cooling conditions and the cooling characteristics for the strands is determined in experiments or simulations in advance and may be stored in the adjustment mechanism. In the case where the liquid-spraying devices or the spray nozzles are used in the strand conveying direction, the correlations between the spray cooling conditions and the cooling characteristics for the strands for all combinations of the liquid-spraying devices or the spray nozzles are determined in addition to the correlation between the spray cooling conditions and the cooling characteristics for the strands for each of the liquid-spraying devices or the spray nozzles and may be stored in the adjustment mechanism. The adjustment mechanism drives the liquid-spraying device under spray cooling conditions determined by an operation based on the surface temperatures of the strands to be adjusted and the correlation. For example, in the case where the surface temperatures of the strands can be adjusted to a predetermined temperature by driving one of the liquid-spraying devices or the spray nozzles, the adjustment mechanism can drive the one of the liquid-spraying devices or the spray nozzles and stop the other liquid-spraying devices or the other spray nozzles. In the case where the surface temperatures of the strands can be adjusted to a predetermined temperature by driving two or more of the liquid-spraying devices or the spray nozzles, the adjustment mechanism can drive the two or more of the liquid-spraying devices or the spray nozzles and stop the other liquid-spraying devices or the other spray nozzles. In this way, the adjustment of the spray cooling conditions enables the adjustment of the strand temperatures.

The surface temperatures of the strands can vary in a region extending from a position where cooling is performed with the gas-blowing device to a position where the strands are introduced into the strand cutter or from a position where the surface temperature is measured with the measurement device to a position where the strands are introduced into the strand cutter. Thus, in order to allow the surface temperatures of the strands to be in the set temperature range, preferably, the high-temperature-side threshold is set to a temperature of lower than the upper limit of the set temperature range (for example, a temperature 5° C. lower than the upper limit), and the low-temperature-side threshold is set to a temperature of higher than the lower limit of the set temperature range (for example, a temperature 5° C. higher than the lower limit).

The cooling of the strands with the gas-blowing device is performed by adjusting the flow rate of the gas blown or the gas temperature. Regarding the cooling of the strands using the gas temperature of the gas blown or the cooling of the strands using the flow rate of the gas blown (appropriately referred to collectively as "blowing cooling"), the correlation between the blowing cooling conditions and the cooling characteristics for the strands is determined in experiments or simulations in advance and may be stored in the adjustment mechanism. In the case where the gas-blowing devices or the outlet ports are used in the strand conveying direction, the correlations between the blowing cooling conditions and the cooling characteristics for the strands for all combinations of the gas-blowing devices or the outlet ports are determined in addition to the correlation between the blowing cooling conditions and the cooling characteristics for the strands for each of the gas-blowing devices or the outlet ports and may be stored in the adjustment mechanism. The adjustment mechanism drives the gas-blowing device under blowing cooling conditions determined by an operation based on the surface temperatures of the strands to be adjusted and the correlation. For example, in the case where the surface temperatures of the strands can be adjusted to a predetermined temperature by driving one of the gas-blowing devices or the outlet ports, the adjustment mechanism can drive the one of the gas-blowing devices or the outlet ports and stop the other gas-blowing devices or the other outlet ports. In the case where the surface temperatures of the strands can be adjusted to a predetermined temperature by driving two or more of the gas-blowing devices or the outlet ports, the adjustment mechanism can drive the two or more of the gas-blowing devices or the outlet ports and stop the other gas-blowing devices or the other outlet ports. In this way, the adjustment of the blowing cooling conditions enables the adjustment of the strand temperatures.

In the case where the cooling is adjusted by a combination of the spray cooling and the blowing cooling, the correlation between the cooling conditions and the cooling characteristics for the strands when the spray cooling and the blowing cooling are performed is determined in addition to the correlation between the cooling conditions and the cooling characteristics for the strands in each cooling and may be stored in the adjustment mechanism. In the case where the liquid-spraying devices or the spray nozzles and the gas-blowing devices or the outlet ports are used in the strand conveying direction, the correlations between the cooling conditions and the cooling characteristics for the strands for all combinations of the liquid-spraying devices or the spray nozzles and the gas-blowing devices or the outlet ports are determined and may be stored in the adjustment mechanism. The adjustment mechanism preferably drives the liquid-spraying devices and the gas-blowing devices under the spray cooling conditions and the blowing cooling conditions determined by an operation based on the surface temperatures of the strands to be adjusted and the correlations.

In the case where the measurement device is arranged only between the liquid-spraying device and the gas-blowing device, a decrease in strand temperature due to the gas blowing with the gas-blowing device and a decrease in strand temperature due to conveyance to the strand cutter are preferably determined in advance. The threshold of the set temperature range of the surface temperature of each of the strands measured with the measurement device is preferably set to a value in view of the decreases in temperature. The adjustment mechanism preferably adjusts the cooling conditions of the spray cooling in such a manner that the surface temperatures of the strands located between the liquid-spraying device and the gas-blowing device are in the set temperature range.

In the case where measurement devices are arranged between the liquid-spraying device and the gas-blowing device and between the gas-blowing device and the strand cutter, similar to the case where the measurement device is arranged only between the liquid-spraying device and the gas-blowing device, preferably, the threshold of the set temperature range of the surface temperature of each strand measured with the measurement device arranged between the liquid-spraying device and the gas-blowing device is set, and the cooling conditions of the spray cooling are adjusted in such a manner that the surface temperatures of the strands are in the set temperature range. Additionally, the threshold of the set temperature range of the surface temperature of the strand measured with the measurement device arranged between the gas-blowing device and the strand cutter is set, and the cooling conditions of at least one of the spray cooling and the blowing cooling can also be adjusted in such a manner that the surface temperature of the strand is in the set temperature range.

The apparatus for producing a pellet according to an embodiment preferably includes a display device that displays information about the strand surface temperature obtained from the measurement device that measures the surface temperature of the strand or a device that raises an alarm or the like when the surface temperature is outside the set temperature range. The display device or the device that raises an alarm or the like may be integrated with the measurement device or may be separated from the measurement device coupled thereto with a cable or the like. For example, the apparatus may have the following configuration: an Ethernet (registered trademark) cable is connected to the measurement device or the adjustment mechanism of the liquid-spraying device or the gas-blowing device, and information about the strand surface temperatures is transmitted to the management department of a factory or another factory or a department that exercises control over the process via the Internet.

To improve the accuracy of the measurement results in the measurement areas M1 to M11 with the measurement device, a configuration may be used in which a wide measurement area MA including the measurement areas M1 to M11 is set independently of the measurement areas M1 to M11 and the maximum strand temperature measured in the measurement area MA and the highest value of the maximum temperatures measured in the measurement areas M1 to M11 are monitored. The following configuration may also be used: In an ordinary pellet production, the maximum temperature in the measurement area MA should be equal to or close to the highest value of the maximum temperatures measured in the measurement areas M1 to M11. When the temperatures that result in a large difference between these values are measured, for example, an alarm is raised to prompt an operator to set the measurement areas M1 to M11 again.

(6) A step of cutting the strand conveyed on the conveyor belt into pellets and the strand cutter will be described.

The strand cutter is a device that cuts a string-shaped strand group into an appropriate length to form pellets. Various known methods may be employed. A strand cutter having a rotary blade and a stationary blade is exemplified. The pellets formed by cutting with the strand cutter are usually conveyed using a drop and may be subjected to known post-processing step using a vibratory device or a gas-blowing device in order to perform cooling and remove cutting dust attached to pellet surfaces. The pellet length is preferably, but not necessarily, in the range of 0.5 to 10 mm, more preferably 1 to 5 mm.

(7) Others

The pellets produced with the production apparatus and by the production method according to the present invention can be used for various molding processes such as injection molding, extrusion molding, blow molding, and transfer molding and are suitable for injection molding having a problem with weighing failure due to a large amount of powder. Additionally, the pellets can be used for various applications through injection molding, extrusion molding, blow molding, transfer molding, or the like. Examples of the applications include electrical and electronic components such as sensors, LED lamps, connectors, sockets, resistors, relay cases, switches, coil bobbins, capacitors, variable capacitor cases, resonators, various terminal strips, transformers, plugs, printed-circuit boards, tuners, speakers, microphones, headphones, small motors, magnetic head bases, semiconductors, liquid crystals, FDD carriages, FDD chassis, motor brush holders, parabolic antennas, and computer-related components; household and office electrical product components such as VTR components, television set components, irons, hair dryers, rice cooker components, microwave oven components, acoustic components, audio equipment components, e.g., Audio LaserDisc (registered trademark) and compact disks, lighting components, refrigerator components, air conditioner components, typewriter components, and word processor components; machine-related components such as office computer-related components, telephone-related components, facsimile-related components, copier-related components, cleaning jigs, motor components, lighters, and typewriters; optical-device-and-precision-machine-related components such as microscopes, binoculars, cameras, and clocks; plumbing components such as disk holders for faucets, combination faucets, mixing valves, pump components, pipe joints, fittings (e.g., elbows, cheeses, and sockets), water control valves, pressure reducing valves, relief valves, solenoid-operated valves, three-way valves, thermos-valves, hot-water temperature sensors, sensors for the amount of water, adaptors for bathtubs, and water meter housings; and automobile-and-vehicle-related components such as valve alternator terminals, alternator connectors, IC regulators, potentiometer bases for Light Dimmer, various valves including exhaust gas valves, various pipes for fuel-related intake and emission systems, air intake nozzle snorkels, intake manifolds, fuel pumps, engine-cooling water joints, carburetor main bodies, carburetor spacers, exhaust gas sensors, cooling water sensors, oil temperature sensors, throttle position sensors, crank shaft position sensors, air flow meters, brake pad wear sensors, thermostat bases for air conditioners, air flow control valves for heaters, brush holders for radiator motors, water pump impellers, turbine veins, wiper motor-related components, distributors, starter switches, starter relays, wire harnesses for transmissions, windshield washer nozzles, air conditioner panel switch boards, coils for fuel-related electromagnetic valves, connectors for fuses, horn terminals, insulating boards for electric components, step motor rotors, lamp sockets, lamp reflectors, lamp housings, brake pistons, solenoid bobbins, engine oil filters, ignition cases, vehicle-speed sensors, and cable liners.

EXAMPLES

While the present invention will be described in more detail on the basis of examples, the present invention is not limited thereto.

(Apparatus for Producing Pellet)

A production apparatus used in examples of the present invention will be described with reference to FIG. 1. An ejection port 2 configured to eject 15 strands was attached to an end of a feeder 1 (twin-screw extruder "TEM-26", available from Toshiba Machine Co., Ltd.) configured to melt a thermoplastic resin. A conveyor belt 8 (with a herringbone-weave stainless-steel mesh surface that comes into contact with the strands) configured to convey the ejected strands was installed. Three liquid-spraying devices 3a to 3c configured to cool the strands conveyed on the conveyor belt were arranged at regular intervals in the conveying direction of the conveyor belt and above the conveying surface of the conveyor belt at a height of 170 mm from the conveyor belt. Three gas-blowing devices 6a to 6c were arranged at regular intervals in the conveying direction of the conveyor belt at a height of 100 mm from the conveyor belt. An infrared thermometer (FSV-2000, available from Apiste Corporation) configured to measure the surface temperatures of the cooled strands was fixed with bolts at a height of 800 mm from the conveyor belt. The liquid-spraying devices capable of spraying cooling water with a temperature of 20° C. were used, each liquid-spraying device including a spray nozzle that provides a linear-shaped spray area and a valve used to adjust the flow rate of the liquid sprayed, the valve being attached to a pipe communicating with the spray nozzle. As the gas-blowing devices, air blowers each including an outlet port that provides a linear-shaped blowing area were used.

A strand cutter 9 configured to pelletize the strands conveyed on the conveyor belt was installed adjacent to the conveyor belt.

(Test Example 1) Amount of Powder Immediately After Strand Cutter

First, 0.5 kg of the pellets passed through the strand cutter were collected. The pellets were sifted with a circular sieve having an opening of 2 mm, a diameter of 300 mm, and a depth of 50 mm to remove powder. The resulting powder was weighed, and the mass fraction (ppm) of the powder was calculated with respect to the collected pellets (0.5 kg).

(Test Example 2) Shape of Pellet (Observation of Defect and Whisker)

The pellets obtained by cutting with the strand cutter were collected. The surfaces of the pellets were visually observed (observation of defects and whiskers). Specifically, about 10 kg of the pellets obtained by cutting with the strand cutter were collected in a paper bag. Then 50 pellets were randomly sampled from the paper bag. The pellets were visually observed for the defects of the pellets and the presence or absence of whiskers. The number of pellets having one or more defects or whiskers was examined and evaluated according to criteria described below. Based on the photograph of a cut surface of each of the pellets (two-dimensional information), when the area of one defect or whisker was 5% or more of the cross-sectional area, it was counted as a "defect" or "whisker".

⊙ 1 to 9
◯ 10 to 19
Δ 20 to 29
x 30 or more (Test Example 3) Cross-Sectional Shape of Pellet The pellets obtained by cutting with the strand cutter were collected. The surfaces of the pellets were visually observed (cross-sectional shape). Specifically, about 10 kg of the pellets obtained by cutting with the strand cutter were collected in a paper bag. Then 50 pellets were randomly sampled from the paper bag. The aspect ratio of a cross-section of each of the pellets was visually determined. Based on the photograph of a cut surface of each of the pellets (two-dimensional information), the aspect ratio was determined by measuring two portions, i.e., the longest diameter (major axis) and the shortest diameter (minor axis) of the cross section, of each pellet and calculating the ratio thereof (minor axis/major axis). The aspect ratio was evaluated according to the following criteria:

⊙ 1 or less and 0.85 or more
○ less than 0.85 and 0.70 or more
∆ less than 0.70 and 0.65 or more
× less than 0.65

(Test Example 4) Measurement of Powder Generated by Friction During Conveyance of Pellet First, 0.5 kg of the pellets passed through the strand cutter were collected. The pellets were manually sifted with a circular sieve having an opening of 2 mm, a diameter of 300 mm, and a depth of 50 mm to remove cutting dust. The pellets were collected, washed with water, and dried to completely remove cutting dust attached to the surfaces thereof. Then 240 g of the resulting pellets were divided into four portions of 60 g each. Each portion was placed in a 200-ml vial. The vials were shaken for 10 minutes with a paint shaker ("dispersion tester", available from Toyo Seiki Seisaku-sho, Ltd., shaking conditions: compliant with JIS 5101-1-2). The contents of each vial were sifted with a circular sieve having an opening of 2 mm, a diameter of 300 mm, and a depth of 50 mm to remove powder generated by friction. The resulting powder was weighed, and the mass fraction (ppm) of the powder was calculated with respect to the pellets placed (60 g).

Example 1

Poly(ethylene terephthalate) (A1) ("MA-2103", melting point: 255° C., Tg: 70° C., available from Unitika Ltd.) and calcium carbonate (B1) ("Caltex5" (powder, average particle size: 1.2 μm), available from Maruo Calcium Co., Ltd.) were subjected to dry blending in proportions given in Table 2. The raw material was supplied and melt-kneaded with a twin-screw extruder under conditions given in Table 2. Subsequently, pellets were produced with an apparatus for producing a pellet illustrated in FIG. 1. Specifically, multiple strands (strand diameter: 3 mm) were ejected from the ejection port of the melt-kneading machine. Continuous production was performed for 3 hours while 15 strands were conveyed on a conveyor belt at a speed of 50 m/min at an ambient temperature of the conveyor belt of room temperature (23° C.), thereby producing the pellets.

As illustrated in FIG. 1, the measurement device 4a was arranged between the gas-blowing device 6c and the strand cutter 9. The set temperature range of the surface temperatures of each of the strands was set as given in Table 2. Among the liquid-spraying devices 3a to 3c, the liquid-spraying device 3a was equipped with a single spray nozzle having the ability to supply a liquid at a flow rate of 0 to 3 mL/min per one strand. Each of the liquid-spraying devices 3b and 3c was equipped with two spray nozzles arranged in the width direction of the conveyor, each of the spray nozzles having the ability to supply the liquid at a flow rate of 0 to 1 mL/min per one strand. Each of the gas-blowing devices 6a to 6c was equipped with a nozzle having the ability to supply a gas at a flow rate of 0 to 1 L/s per one strand by controlling a damper, the nozzle providing a blowing-area shape with a width of 12 mm in the conveying direction and a length of 300 mm in the width direction of the conveyor. An adjustment mechanism 5 adjusted cooling conditions of the strands 7 by adjusting the driving of the liquid-spraying devices 3a to 3c and the gas-blowing devices 6a to 6c on the basis of the surface temperatures of the strands 7 output from the measurement device 4a in such a manner that the surface temperatures of the strands 7 were in the set temperature range. Samples used for the tests described above were produced by cutting the strands with the strand cutter into pellets having a pellet length of 3 mm and immediately after the cutting, collecting the pellets in a paper bag.

Comparative Example 1

The line from the measurement device 4a to the adjustment mechanism 5 was turned off. The adjustments of the flow rate of the cooling water sprayed and the flow rate of air blown were not performed by driving the liquid-spraying devices 3a to 3c and the gas-blowing devices 6a to 6c on the basis of the surface temperatures of the strands 7. Instead, pellets were produced as in Example 1, except that the adjustments were performed on the basis of the surface temperatures of the pellets. Specifically, poly(ethylene terephthalate) (A1) ("MA-2103", melting point: 255° C., Tg: 70° C., available from Unitika Ltd.) and calcium carbonate (B1) ("Caltex5" (powder, average particle size: 1.2 μm), available from Maruo Calcium Co., Ltd.) were subjected to dry blending in proportions given in Table 2. The raw material was supplied and melt-kneaded with a twin-screw extruder under conditions given in Table 2. Subsequently, pellets were produced with an apparatus for producing a pellet illustrated in FIG. 1. More specifically, 15 strands were ejected from the ejection port of the melt-kneading machine. Continuous production was performed for 3 hours while 15 strands were conveyed on a conveyor belt at a speed of 50 m/min at an ambient temperature of the conveyor belt of room temperature (23° C.), thereby producing the pellets.

At that time, the strands were cut with the strand cutter into pellets having a pellet length of 3 mm. About 10 kg of the pellets were collected in a paper bag. The surface temperatures of the pellets were separately measured three times with an infrared thermometer ("IR-302", available from Custom Corporation). The pellets were produced while an operator adjusted the settings of the liquid-spraying devices 3a to 3c and the gas-blowing devices 6a to 6c as in Example 1 in such a manner that the average of the surface temperatures of the pellets was in the set temperature range.

Also in the comparative example, the surface temperatures of the strands were measured as reference values with an infrared thermometer (FSV-2000, available from Apiste Corporation) as in Example 1 and displayed on a display device 4b as an image indicating a temperature distribution.

TABLE 2

|  | Example 1 | Comparative example 1 |
|---|---|---|
| Composition·percentage [wt %] | | |
| A1 | 60 | 60 |
| B1 | 40 | 40 |
| Kneading condition | | |
| Cylinder temperature | 270 | 270 |
| Output rate Q [kg/hour] | 30 | 30 |
| Number of rotation of screw N [rpm] | 150 | 150 |
| Cooling water spraying condition (set value) | | |
| Water flow rate [milliliter/minute/one strand] | 50 | 50 |
| Air blowing condition (set value) | | |
| Blowing rate [liter/second/one strand] | 2 | 2 |
| Device condition | | |
| L1 [mm] | 120 | 120 |
| L2 [mm] | 200 | 200 |
| L3 [mm] | 500 | 500 |
| L4 [mm] | 1000 | 1000 |
| L5 [mm] | 1000 | 1000 |
| Set temperature range of strand surface temperature [° C.] | 90-140 | 90-140 |
| Result | | |
| Number of times strand surface temperature displayed as an image exceeded set temperature range | 2 | 9 |
| Test example 1: Amount of cutting dust [ppm] | 430 | 1500 |
| Test example 2: Surface observation (defect, whisker) | ⊙ | Δ |
| Test example 3: Surface observation (aspect ratio) | ⊙ | Δ |
| Test example 4: Amount of powder generated by friction [ppm] | 4100 | 31000 |

TABLE 3

|  | Example 2 | Comparative example 2 |
|---|---|---|
| Composition·percentage [wt %] | | |
| A2 | 50 | 50 |
| B2 | 50 | 50 |
| Kneading condition | | |
| Cylinder temperature | 260 | 260 |
| Output rate Q [kg/hour] | 30 | 30 |
| Number of rotation of screw N [rpm] | 150 | 150 |
| Cooling water spraying condition (set value) | | |
| Water flow rate [milliliter/minute/one strand] | 30 | 30 |
| Air blowing condition (set value) | | |
| Blowing rate [liter/second/one strand] | 2 | 2 |
| Device condition | | |
| L1 [mm] | 500 | 500 |
| L2 [mm] | 1000 | 1000 |
| L3 [mm] | 500 | 500 |
| L4 [mm] | 1000 | 1000 |
| L5 [mm] | 1000 | 1000 |
| Set temperature range of strand surface temperature [° C.] | 80-120 | 80-120 |
| Result | | |
| Number of times strand surface temperature displayed as an image exceeded set temperature range | 7 | 49 |
| Test example 1: Amount of cutting dust [ppm] | 450 | 12000 |
| Test example 2: Surface observation (defect, whisker) | ⊙ | ○ |
| Test example 3: Surface observation (aspect ratio) | ⊙ | ○ |
| Test example 4: Amount of powder generated by friction [ppm] | 900 | 3000 |

A2: Polyamide "1030", m.p. 220° C., available from Ube Industries, Ltd.

A3: Polypropylene "Prime Polypro E111G", m.p. 160° C., available from Prime Polymer Co., Ltd.

A4: Polystyrene "CR2600", softening point: 100° C., available from DIC Corporation A5: PPS "TR-03G", m.p. 280° C., available from DIC Corporation B2: Glass fiber "CS 3J-256W" (diameter: 11 gm, chopped strand), available from Nitto Boseki Co., Ltd.

TABLE 4

|  | Example 3 | Comparative example 3 |
|---|---|---|
| Composition·percentage [wt %] | | |
| A3 | 60 | 60 |
| B1 | 40 | 40 |
| Kneading condition | | |
| Cylinder temperature | 230 | 230 |
| Output rate Q [kg/hour] | 20 | 20 |
| Number of rotation of screw N [rpm] | 150 | 150 |
| Cooling water spraying condition (set value) | | |
| Water flow rate [milliliter/minute/one strand] | 150 | 150 |
| Air blowing condition (set value) | | |
| Blowing rate [liter/second/one strand] | 2 | 2 |
| Device condition | | |
| L1 [mm] | 900 | 900 |
| L2 [mm] | 1000 | 1000 |
| L3 [mm] | 500 | 500 |
| L4 [mm] | 1000 | 1000 |
| L5 [mm] | 1000 | 1000 |
| Set temperature range of strand surface temperature [° C.] | 40-80 | 40-80 |
| Result | | |
| Number of times strand surface temperature displayed as an image exceeded set temperature range | 2 | 69 |
| Test example 1: Amount of cutting dust [ppm] | 490 | 23000 |
| Test example 2: Surface observation (defect, whisker) | ⊙ | Δ |
| Test example 3: Surface observation (aspect ratio) | ⊙ | Δ |
| Test example 4: Amount of powder generated by friction [ppm] | 1000 | 4000 |

TABLE 5

|  | Example 4 | Comparative example 4 |
|---|---|---|
| Composition•percentage [wt %] | | |
| A4 | 70 | 70 |
| B1 | 30 | 30 |
| Kneading condition | | |
| Cylinder temperature | 250 | 250 |
| Output rate Q [kg/hour] | 25 | 25 |
| Number of rotation of screw N [rpm] | 150 | 150 |
| Cooling water spraying condition (set value) | | |
| Water flow rate [milliliter/minute/one strand] | 80 | 80 |
| Air blowing condition (set value) | | |
| Blowing rate [liter/second/one strand] | 10 | 10 |
| Device condition | | |
| L1 [mm] | 900 | 900 |
| L2 [mm] | 1000 | 1000 |
| L3 [mm] | 500 | 500 |
| L4 [mm] | 1000 | 1000 |
| L5 [mm] | 1000 | 1000 |
| Set temperature range of strand surface temperature [° C.] | 70-120 | 70-120 |
| Result | | |
| Number of times strand surface temperature displayed as an image exceeded set temperature range | 3 | 36 |
| Test example 1: Amount of cutting dust [ppm] | 760 | 60000 |
| Test example 2: Surface observation (defect, whisker) | ○ | X |
| Test example 3: Surface observation (aspect ratio) | ○ | X |
| Test example 4: Amount of powder generated by friction [ppm] | 8000 | 60000 |

TABLE 6

|  | Example 5 | Comparative example 5 |
|---|---|---|
| Composition•percentage [wt %] | | |
| A5 | 30 | 30 |
| B1 | 30 | 30 |
| B2 | 40 | 40 |
| Kneading condition | | |
| Cylinder temperature | 280 | 280 |
| Output rate Q [kg/hour] | 30 | 30 |
| Number of rotation of screw N [rpm] | 150 | 150 |
| Cooling water spraying condition (set value) | | |
| Water flow rate [milliliter/minute/one strand] | 5 | 5 |
| Air blowing condition (set value) | | |
| Blowing rate [liter/second/one strand] | 2 | 2 |
| Device condition | | |
| L1 [mm] | 400 | 400 |
| L2 [mm] | 1300 | 1300 |
| L3 [mm] | 500 | 500 |
| L4 [mm] | 1500 | 1500 |
| L5 [mm] | 1000 | 1000 |
| Set temperature range of strand surface temperature [° C.] | 175-195 | 175-195 |
| Result | | |
| Number of times strand surface temperature displayed as an image exceeded set temperature range | 1 | 120 |
| Test example 1: Amount of cutting dust [ppm] | 480 | 25000 |
| Test example 2: Surface observation (defect, whisker) | ⊙ | Δ |
| Test example 3: Surface observation (aspect ratio) | ⊙ | Δ |
| Test example 4: Amount of powder generated by friction [ppm] | 490 | 3500 |

TABLE 7

|  | Example 6 | Comparative example 6 |
|---|---|---|
| Composition•percentage [wt %] | | |
| A5 | 60 | 60 |
| B2 | 40 | 40 |
| Kneading condition | | |
| Cylinder temperature | 280 | 280 |
| Output rate Q [kg/hour] | 30 | 30 |
| Number of rotation of screw N [rpm] | 150 | 150 |
| Cooling water spraying condition (set value) | | |
| Water flow rate [milliliter/minute/one strand] | 5 | 5 |
| Air blowing condition (set value) | | |
| Blowing rate [liter/second/one strand] | 2 | 2 |
| Device condition | | |
| L1 [mm] | 800 | 800 |
| L2 [mm] | 1300 | 1300 |
| L3 [mm] | 500 | 500 |
| L4 [mm] | 1500 | 1500 |
| L5 [mm] | 1000 | 1000 |
| Set temperature range of strand surface temperature [° C.] | 175-195 | 175-195 |
| Result | | |
| Number of times strand surface temperature displayed as an image exceeded set temperature range | 1 | 155 |
| Test example 1: Amount of cutting dust [ppm] | 400 | 10000 |
| Test example 2: Surface observation (defect, whisker) | ⊙ | Δ |
| Test example 3: Surface observation (aspect ratio) | ⊙ | Δ |
| Test example 4: Amount of powder generated by friction [ppm] | 390 | 2800 |

In the production method in each of Examples 1 to 6, the flow rate of water sprayed and the flow rate of air blown can be adjusted in accordance with the surface temperatures of the strands before cutting. A time lag can be suppressed or minimized in adjusting the flow rate of water sprayed and the flow rate of air blown against a change in strand temperature. In fact, the number of times the strand surface temperature exceeded the set temperature range was reduced. Furthermore, if the strand surface temperature exceeded the set temperature range, the temperature range exceeding the set temperature range was markedly suppressed. In contrast, in the production method in each of comparative examples 1 to 6, it is necessary to collect the pellets immediately after cutting and measure their temperatures. As is clear from a comparison of a change in pellet temperature and a change in strand surface temperature described as a reference value, inevitably, a time lag occurs in adjusting the flow rate of water sprayed and the flow rate of air blown against a change in pellet temperature. In fact, the temperature range exceeding the set temperature range was markedly increased before the strand surface temperature changed. Furthermore, the number of times the strand surface temperature exceeded the set temperature range was markedly increased.

The results obtained in Examples 1 to 6, compared with Comparative examples 1 to 6, respectively, indicated that the formation of bonded pellets, whiskers and defects of the cut surfaces of pellets, and cutting dust were suppressed even when the continuous production was performed for a long time. The results of an accelerated test (Test example 4) assuming a powder formation state due to friction between the pellets during conveyance also indicated that in the production methods in Examples 1 to 6, the generation of a powder attributed to friction was suppressed, compared with Comparative examples 1 to 6.

While the preferred embodiments according to the present invention have been described above with reference to the attached drawings, It goes without saying that the present invention is not limited those embodiments. The shapes and combinations of the constituent members used in the above embodiments are merely examples, and various changes can be made in accordance with design requirements or the like without departing from the gist of the present invention.

REFERENCE SIGNS LIST 1 feeder
2 ejection port
3a, 3b, 3c cooling water-spraying device (equipped with water flow rate adjustment valve)
4a measurement device
4b display device for displaying measurement result
5 adjustment mechanism
6a, 6b, 6c air blower
7 strand
8 conveyor belt
9 strand cutter
L1 distance between position where strand is ejected from ejection port 2 of feeder and position where strand comes first into contact with liquid sprayed from liquid-spraying devices 3a to 3c
L2 distance defined by subtracting L1 from distance between ejection port 2 of feeder and a position where strand comes last into contact with liquid sprayed from liquid-spraying devices 3a to 3c
L3 distance defined by subtracting L2 from distance between ejection port 2 of feeder and a position where strand comes first into contact with gas blown from gas-blowing devices 6a to 6c
L4 distance defined by subtracting L3 from distance between ejection port 2 of feeder and a position where strand comes last into contact with gas blown from gas-blowing devices 6a to 6c
L5 distance defined by subtracting L4 from distance between ejection port 2 of feeder and strand cutter
T time lag

The invention claimed is:

1. A method for producing pellets, comprising the steps of conveying a plurality of strands on a conveyor belt, the plurality of strands being formed by melting a composition containing a thermoplastic resin and an additive and then ejecting the molten composition from a feeder; spraying a liquid toward the plurality of strands on the conveyor belt; blowing a gas toward the plurality of strands on the conveyor belt; cutting the plurality of strands conveyed by the conveyor belt into pellets;
    measuring a surface temperature of the plurality of strands at measurement areas set on the conveyor belt at a position before cutting the plurality of strands;
    providing a measurement device which comprises both:
        a plurality of a first measurement area set in a width direction of the conveyor belt and capable of individually measuring the surface temperature for each strand of the plurality of strands when the first measurement area is set as the measurement area on the conveyor belt, and
        a second measurement area set in the width direction of the conveyor belt and capable of collectively measuring the surface temperature in an area which contains all of the plurality of strands when the second measurement area is set as the measurement area on the conveyor belt,
    measuring the surface temperature of the plurality of strands at both the first and second measurement areas set as the measurement area on the conveyor belt;
    determining a maximum strand temperature from a group consisting of: (a) a highest temperature value of maximum surface temperatures of respective strands of the plurality of strands and (b) a lowest temperature value of maximum surface temperatures of respective strands of the plurality of strands; and
    adjusting at least one of spraying the liquid and blowing the gas on a basis of a measurement result of the measured maximum strand temperature of the plurality of strands measured at both the first and the second measurement areas set as the measurement area on the conveyor belt.

2. The method for producing pellets according to claim 1, wherein at least one treatment selected from spraying the liquid and blowing the gas is performed at a plurality of positions in a conveying direction of the plurality of strands, and
    wherein in the at least one treatment at the plurality of positions, the at least one treatment is performed at at least two positions under different conditions from each other.

3. The method for producing pellets according to claim 1, wherein the surface temperature exceeding a measurement lower limit is individually measured for each strand of the plurality of strands.

4. The method for producing pellets according to claim 1, wherein a highest temperature value of maximum surface temperatures of the respective strands of the plurality of strands, or a lowest temperature value of the maximum surface temperatures of the respective strands of the plurality of strands are measured.

5. The method for producing pellets according to claim 1, wherein the surface temperatures of the plurality of strands are measured before blowing the gas and after spraying the liquid.

6. The method for producing pellets according to claim 1, wherein the at least one spraying of the liquid and the blowing of the gas is adjusted on the basis of the measurement result of the measured maximum strand temperature determined when the surface temperature of the plurality of strands is lower than a low-temperature-side threshold temperature based on a melting point of a thermoplastic resin, and is adjusted on the basis of the measurement result of the measured maximum strand temperature determined when the surface temperature of the plurality of strands is higher than a high-temperature-side threshold based on the melting point of the thermoplastic resin.

\* \* \* \* \*